UNITED STATES PATENT OFFICE.

LUDWIG SEITZ AND HERMANN WINTZ, OF ERLANGEN, GERMANY, ASSIGNORS TO SOCIETY OF CHEMICAL INDUSTRY IN BASLE, OF BASEL, SWITZERLAND.

PROCESS FOR THE MANUFACTURE OF A MENSES-INCREASING SUBSTANCE FROM CORPUS LUTEUM.

1,318,698.   Specification of Letters Patent.   Patented Oct. 14, 1919.

No Drawing.   Application filed April 14, 1915.   Serial No. 21,404.

*To all whom it may concern:*

Be it known that we, LUDWIG SEITZ, doctor of medicine and professor, a subject of the King of Bavaria, and resident of Erlangen, Germany, and HERMANN WINTZ, doctor of medicine, a subject of the King of Bavaria, and resident of Erlangen, Germany, have invented a new and useful Process for the Manufacture of a Menses-Increasing Substance from Corpus-Luteum, of which the following is a full, clear, and exact specification.

All preparations hitherto proposed for regulating menstruation have the common disadvantage that they contain more or less injurious admixtures and are uncertain in their action on account of the prevailing method of administration per os and inexact dosage. We have now found, that a therapeutically valuable substance, which can be exactly dosed and injected, can be isolated in a pure state from the corpus luteum and that the substance so obtained possesses pronounced menses increasing action.

The carrying out of the process may be illustrated as follows:

Fresh corpora lutea which can be distinguished by their slight reddish coloration and their softness to the touch are advantageously employed. The corpus luteum at once removed from the ovary of a freshly slaughtered animal is preserved in absolute alcohol in dark bottles. The yellow bodies are reduced in a meat chopping machine and extracted with absolute alcohol, for 24 hours at 60° C. The mass is then filtered, the residue dried, ground and the cells destroyed by trituration with quartz sand. The mass is then extracted with chloroform at 60° C. the extract filtered and the residue of the filtration boiled out with alcohol. The liquids thus obtained by the extraction with cold alcohol, hot alcohol, chloroform and boiling alcohol are poured together and the fatty mass separating from the hot liquids on cooling is isolated by filtration. From the filtered liquid the water, which contains the lipoprotein in solution is removed by adding chloroform in excess. By adding again water to the mixture of alcohol extracts and chloroform extract and by further precipitating by an excess of chloroform, the whole therapeutically active substance for inducing menstruation is obtained. The aqueous solutions so obtained are poured together and evaporated to constant weight and by washing with ether the small impurities still contained in the residue are eliminated. The pure preparation thus obtained is dissolved in an absolute dry state in a physiological solution of common salt, so that 1 cubic centimeter of the solution contains 0.001 gram of the active substance. The solution is finally sterilized by Uhlenhut-Berkhefeld filters and drawn off into ampullæ.

Instead of being prepared as sole final product according to the above described process, the said substance can be prepared besides of a substance also contained in the corpus luteum and having a therapeutical action directly opposed, namely a menses controlling substance, the preparation of which is described in the specification of our application for Letters Patent Ser. No. 21,405. For this purpose both the alcoholic extracts obtained according to the process described in the said application, by extracting the reduced corpora lutea with alcohol, acetone, cold and warm ether, chloroform and again alcohol, are poured together and an excess of chloroform is added thereto, whereby an aqueous liquid is separated which contains the lipoproteid. The watery liquid separated is allowed to settle and the clear part thereof is drawn off by a siphon, and in order to obtain all lipoproteid distilled water is again added to the alcohol-chloroform-extract mixture, the mixture shaken and precipitated again with pure chloroform and this process is repeated until the ninhydrin reaction is no longer given by the watery solution resulting from the precipitation with chloroform. The aqueous solutions thus obtained contain the menses increasing agent. The aqueous liquid is evaporated to constant weight and the slight impurities still remaining in the residue are removed by washing with ether.

The menses increasing, therapeutic active substance thus prepared belongs to the class of lecithalbumens, has a deep brown coloration and is of a very solid, stearinlike consistence. It begins to get soft between 50 to 60° C. By drying it in a thin layer, imperfect crystals separate out. The substance dissolves easily in water and more easily in alcohol of 40 per cent. to clear solutions. It is insoluble in ether. The analysis gave the following composition:

| | |
|---|---|
| Carbon | 61.20% |
| Hydrogen | 5.94% |
| Nitrogen | 5.24% |
| Oxygen | 22.24% |
| Sulfur | 2.75% |
| Phosphor | 2.30% | from which may be calculated the simplest empirical formula: $C_{77}H_{90}N_6O_{21}PS$. This substance is to be employed therapeutically when menstruation fails or is too scanty. Also with immature development of the female sexual organs, it acts favorably on the growth of the genital organs and improves their biological function, when it is employed for a sufficiently long time. It is administered by subcutaneous injections. It is completely non irritating, harmless and non poisonous, even when often injected, and especially anaphylactical phenomena do not arise.

What we claim is:

The described process for the manufacture of a menses increasing substance from corpus luteum consisting in separting the watery liquid containing the active substance from the mixture of alcohol extracts and chloroform extract, obtained by successive extraction of ovaries with cold alcohol, hot alcohol, chloroform and boiling alcohol, by adding an excess of chloroform to the said mixture of extracts, and in isolating the active substance by evaporating the said watery liquid separated from the extracts and purifying the residue with ether.

In witness whereof we have hereunto signed our names this 23rd day of March, 1915, in the presence of two subscribing witnesses.

Dr. LUDWIG SEITZ.
Dr. HERMANN WINTZ.

Witnesses:
  Oscar Bock,
  Willy Fohmund.